(12) United States Patent
Shin et al.

(10) Patent No.: US 10,041,706 B2
(45) Date of Patent: Aug. 7, 2018

(54) AIR CONDITIONER AND METHOD FOR CONTROLLING AN AIR CONDITIONER

(71) Applicant: LG Electronics Inc., Seoul (KR)

(72) Inventors: Kwangho Shin, Seoul (KR); Hojong Jeong, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 14/990,570

(22) Filed: Jan. 7, 2016

(65) Prior Publication Data

US 2016/0201962 A1    Jul. 14, 2016

(30) Foreign Application Priority Data

Jan. 12, 2015    (KR) .................. 10-2015-0004175

(51) Int. Cl.
  *F25B 13/00*    (2006.01)
  *F25B 7/00*    (2006.01)
  (Continued)

(52) U.S. Cl.
  CPC .............. *F25B 13/00* (2013.01); *F25B 7/00* (2013.01); *F25B 27/02* (2013.01); *F25B 30/02* (2013.01);
  (Continued)

(58) Field of Classification Search
  CPC ............ F25B 2327/00; F25B 2327/001; F25B 2400/06; F25B 27/00; F25B 2313/0211; F25B 2313/02532; F24F 1/44
  See application file for complete search history.

(56) References Cited

U.S. PATENT DOCUMENTS

| 3,984,224 | A | * | 10/1976 | Dawkins | ............ | B60H 1/3204 |
| | | | | | | 62/236 |
| 4,051,691 | A | * | 10/1977 | Dawkins | ............ | B60H 1/3204 |
| | | | | | | 62/236 |

(Continued)

FOREIGN PATENT DOCUMENTS

| EP | 1 202 005 | 5/2002 |
| EP | 1 288 592 | 3/2003 |

(Continued)

OTHER PUBLICATIONS

European Search Report dated May 13, 2016.

(Continued)

*Primary Examiner* — Cassey D Bauer
(74) *Attorney, Agent, or Firm* — Ked & Associates, LLP (57) ABSTRACT

An air conditioner and a method for controlling an air conditioner are provided. The air conditioner may include at least one indoor device; an electric heat pump (EHP) outdoor device connected to the at least one indoor device, configured to drive a first compressor using electric power, and having a first outdoor heat exchanger for heat exchange of a refrigerant; a gas heat pump (GHP) outdoor device connected to the at least one indoor device, and having an engine configured to drive a second compressor using a burned gas, a second outdoor heat exchanger for heat exchange of the refrigerant, and a waste heat exchanger configured to exchange heat with the refrigerant using waste heat of the engine; and a low pressure refrigerant common pipe configured to connect the first outdoor heat exchanger with the second outdoor heat exchanger and to supply a low pressure refrigerant of the GHP outdoor device to the EHP outdoor device.

23 Claims, 6 Drawing Sheets

(51) Int. Cl.
*F25B 30/02* (2006.01)
*F25D 21/06* (2006.01)
*F25B 27/02* (2006.01)
*F25B 47/02* (2006.01)
*F25B 49/02* (2006.01)

(52) U.S. Cl.
CPC .............. *F25B 47/02* (2013.01); *F25B 49/02* (2013.01); *F25D 21/06* (2013.01); *F25B 2400/05* (2013.01); *F25B 2400/06* (2013.01)

(56) References Cited

U.S. PATENT DOCUMENTS

| | | | |
|---|---|---|---|
| 4,614,090 | A | 9/1986 | Kaneko et al. |
| 5,279,131 | A | 1/1994 | Urushihata et al. |
| 5,526,649 | A | 6/1996 | Sada |
| 5,673,570 | A | 10/1997 | Sada |
| 6,735,969 | B2 * | 5/2004 | Kasagi .................... F25B 13/00 237/2 B |
| 9,909,784 | B2 | 3/2018 | Toya et al. |
| 2002/0050351 | A1 | 5/2002 | Yoshimura et al. |
| 2004/0050093 | A1 | 3/2004 | Lifson et al. |
| 2004/0134218 | A1 | 7/2004 | Alexandre |
| 2005/0086954 | A1 | 4/2005 | Song et al. |
| 2005/0257565 | A1 | 11/2005 | Lee et al. |
| 2008/0034777 | A1 | 2/2008 | Copeland et al. |
| 2010/0107665 | A1 | 5/2010 | Kawano et al. |
| 2010/0198415 | A1 | 8/2010 | Kawano et al. |
| 2014/0116673 | A1 | 5/2014 | Kang et al. |
| 2014/0360222 | A1 | 12/2014 | Masui |
| 2015/0027154 | A1 | 1/2015 | Lee et al. |
| 2016/0245536 | A1 | 8/2016 | Iwasaki |
| 2016/0252261 | A1 | 9/2016 | Cha et al. |
| 2016/0356534 | A1 | 12/2016 | Hatada et al. |
| 2017/0082334 | A1 | 3/2017 | Kawagoe et al. |
| 2018/0031287 | A1 | 2/2018 | Nagae et al. |

FOREIGN PATENT DOCUMENTS

| | | |
|---|---|---|
| EP | 1 628 094 | 2/2006 |
| EP | 1 882 890 | 1/2008 |
| EP | 1 882 891 | 1/2008 |
| JP | 07-332815 | 12/1995 |
| JP | 08-254371 | 10/1996 |
| JP | 11-315719 A | 11/1999 |
| JP | 2000-097515 | 4/2000 |
| JP | 2002-130743 | 5/2002 |
| JP | 2002-168539 | 6/2002 |
| JP | 2003-021416 | 1/2003 |
| JP | 2003-194384 | 7/2003 |
| JP | 2006-194467 | 7/2006 |
| JP | 2007-225141 | 9/2007 |
| JP | 2008-309383 | 12/2008 |
| JP | 2009-079813 | 4/2009 |
| JP | 2011-75162 | 4/2011 |
| JP | 2012-007868 | 1/2012 |
| JP | 2014-092344 | 5/2014 |
| KR | 10-0199325 | 6/1999 |
| KR | 10-2004-0085540 | 10/2004 |
| KR | 10-2003-0077857 A | 5/2005 |
| KR | 10-2005-0043089 A | 5/2005 |
| KR | 10-2005-0112151 | 5/2006 |
| KR | 10-0575682 | 5/2006 |
| KR | 10-2007-0014952 | 2/2007 |
| KR | 10-0765563 | 10/2007 |
| KR | 10-2010-0002770 A | 1/2010 |
| KR | 10-2010-0069188 | 6/2010 |
| KR | 10-2010-0129138 | 12/2010 |
| KR | 10-2014-0052339 A | 5/2014 |
| WO | WO 2008/084657 | 7/2008 |
| WO | WO 2014/065548 | 5/2014 |

OTHER PUBLICATIONS

Korean Office Action issued in Application No. 10-2015-0004180 dated Dec. 4, 2015.
Korean Office Action issued in Application No. 10-2015-0004227 dated Jan. 4, 2016.
European Search Reports dated May 31, 2016 (16150596.1).
European Search Reports dated May 31, 2016 (16150600.1).
Korean Office Action dated Jul. 25, 2016.
European Search Report dated Jun. 23, 2016 issued in Application No. 16150587.0.
Korean Notice of Allowance dated Jul. 26, 2016 issued in Application No. 10-2015-0004223.
Korean Notice of Allowance dated Jan. 10, 2017 issued in Application No. 10-2015-0004275.
U.S. Appl. No. 14/991,135, filed Jan. 8, 2016, Maria Alexandra Elve.
U.S. Appl. No. 14/991,247, filed Jan. 8, 2016, Frantz F. Jules.
U.S. Appl. No. 14/992,460, filed Jan. 11, 2016.
U.S. Appl. No. 14/992,556, filed Jan. 11, 2016.
U.S. Appl. No. 14/993,693, filed Jan. 12, 2016.
U.S. Appl. No. 14/993,796, filed Jan. 12, 2016.
Korean Notice of Allowance dated May 25, 2016.
European Search Report dated May 25, 2016.
European Search Report dated Jun. 23, 2016.
Korean Office Action dated Jun. 28, 2016.
Korean Office Action dated Aug. 12, 2016 issued in Application No. 10-2015-0004180.
Korean Office Action dated Nov. 27, 2015 issued in Application No. 10-2015-0004174.
U.S. Notice of Allowance dated Sep. 7, 2017 issued in co-pending U.S. Appl. No. 14/993,693.
U.S. Office Action dated Nov. 14, 2017 issued in co-pending U.S. Appl. No. 14/991,135.
U.S. Office Action dated Dec. 11, 2017 issued in U.S. Appl. No. 14/992,556.
Korean Notice of Allowance dated Dec. 26, 2016 issued in Application No. 10-2015-0004175.
Korean Notice of Allowance dated Dec. 26, 2016 issued in Application No. 10-2015-0004178.
U.S. Office Action dated Jul. 6, 2017 issued in co-pending U.S. Appl. No. 14/992,460.
U.S. Office Action dated Jul. 12, 2017 issued in co-pending U.S. Appl. No. 14/992,556.
U.S. Notice of Allowance dated Jul. 18, 2017 issued in co-pending U.S. Appl. No. 14/993,796.
English Translation of JP 2011-075162 (previously dated Aug. 11, 2016).
U.S. Office Action dated Jan. 12, 2018 issued in co-pending U.S. Appl. No. 14/991,247.
U.S. Notice of Allowance dated Apr. 20, 2018 issued in co-pending U.S. Appl. No. 14/992,556.
U.S. Office Action dated Jun. 4, 2018 issued in U.S. Appl. No. 14/991,135.

* cited by examiner

AIR CONDITIONER AND METHOD FOR CONTROLLING AN AIR CONDITIONER

CROSS-REFERENCE TO RELATED APPLICATION(S)

This application claims priority under 35 U.S.C. § 119 to Korean Application No. 10-2015-0004175, filed in Korea on Jan. 12, 2015, whose entire disclosure is hereby incorporated by reference.

BACKGROUND

1. Field

An air conditioner and a method for controlling an air conditioner are disclosed herein.

2. Background

An air conditioner is an apparatus that cools, warms, or purifies indoor air to provide a more comfortable indoor environment for a user. An air conditioner may be classified as an electric heat pump (EHP) type, which uses electric power or a gas heat pump (GHP) type, which uses a gas fuel, such as liquid petroleum gas (LPG) and liquefied natural gas (LNG), according to a power source for driving a compressor. In a GHP type, an engine is operated by burning a gas fuel, and thus, a compressor is driven.

A conventional EHP type air conditioner is disclosed in Korean Patent Application No. 10-2003-0077857, which is hereby incorporated by reference. In the conventional EHP type air conditioner, as the compressor may be easily controlled by adjusting a supply current, it is possible to respond to a partial load, and thus, the conventional EHP type air conditioner has high energy efficiency. However, in the EHP type air conditioner, there is a problem in that an outdoor heat exchanger is covered with frost when low temperature warming is performed.

A conventional GHP type air conditioner is also disclosed in Korean Patent Application No. 10-2003-0077857. As the conventional GHP type air conditioner uses waste heat of the engine, it has excellent defrosting performance, but there is a problem in that it has low engine efficiency due to heat loss, for example. Therefore, measures capable of providing an air conditioner having further improved performance and efficiency are required.

BRIEF DESCRIPTION OF THE DRAWINGS

Embodiments will be described in detail with reference to the following drawings in which like reference numerals refer to like elements, and wherein.

DETAILED DESCRIPTION

In the following detailed description of embodiments, reference is made to the accompanying drawings that form a part hereof, and in which is shown by way of illustration embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense, and the scope is defined only by the appended claims.

Figure 1:
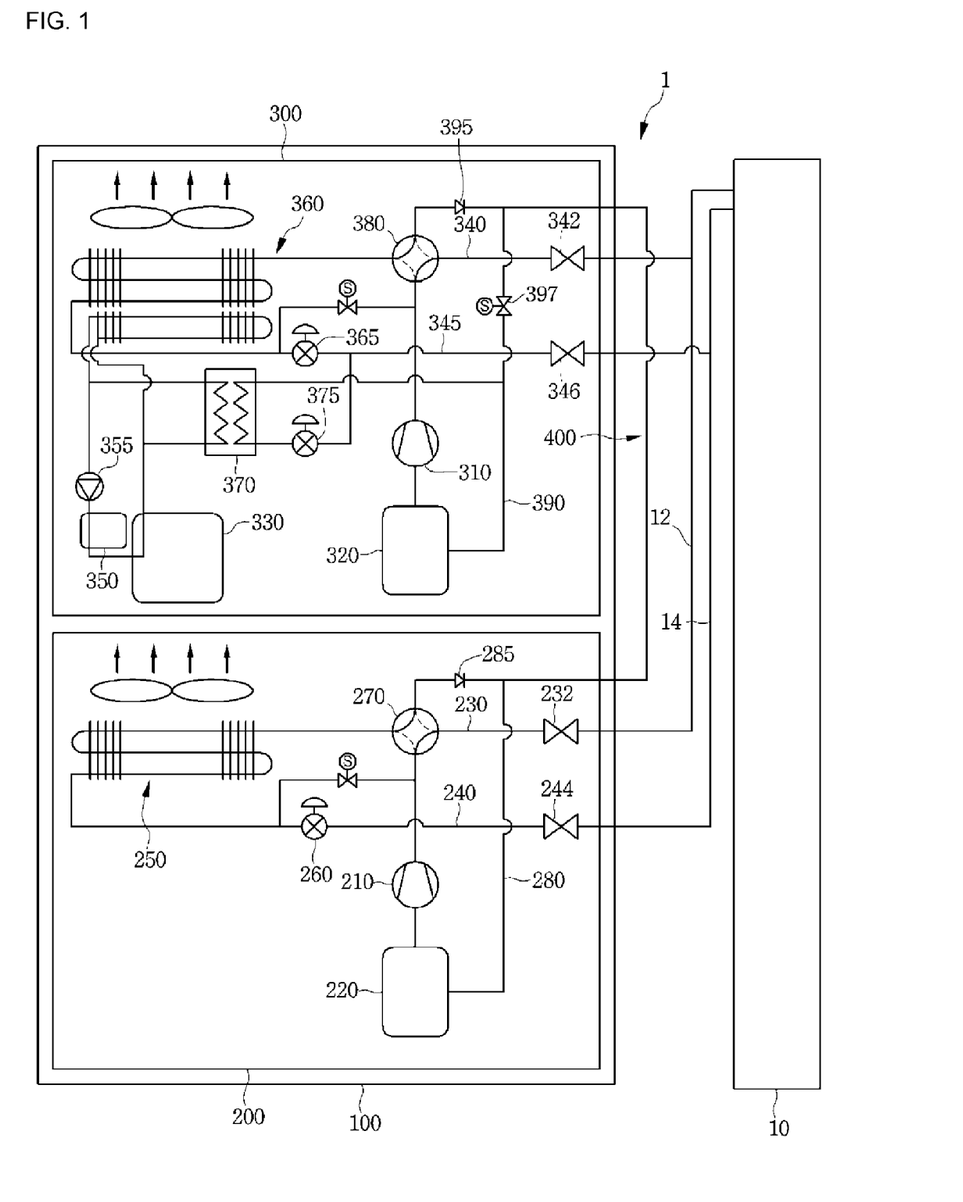
FIG. 1 is a schematic diagram of an air conditioner according to an embodiment.

FIG. 1 is a schematic diagram of an air conditioner according to an embodiment. Referring to FIG. 1, the air conditioner 1 may include an indoor unit or device 10 and an outdoor unit or device 100. One or a plurality of indoor units 10 may be provided. The one or more indoor units 10 may be connected with the outdoor unit 100, and may cool, warm, or purify indoor air.

The indoor unit 10 may include a pair of indoor unit pipes 12 and 14 for connection with the outdoor unit 100. The pair of indoor unit pipes 12 and 14 may include an indoor unit gas pipe 12 that may connect an EHP gas pipe 230 and a GHP gas pipe 340, which will be described hereinafter, and an indoor unit liquid pipe 14, which may connect an EHP liquid pipe 240 and a GHP liquid pipe 345, which will be described hereinafter.

The outdoor unit 100 may be connected with the one or more indoor unit 10, and may perform compressing and expanding, for example, of a refrigerant to allow a sufficient heat exchanging operation of the indoor unit 10. A plurality of outdoor units 100 may be provided. Hereinafter, as an example, an embodiment having one pair of outdoor units 100 will be described.

The outdoor unit 100 may be a combined type including an electric heat pump (EHP) type using electric power and a gas heat pump (GHP) type using a gas fuel, such as LPG and LNG. The outdoor unit 100 may include an EHP outdoor unit or device 200, a GHP outdoor unit or device 300, and a low pressure refrigerant common pipe 400. The EHP outdoor unit 200 may be an outdoor unit operated using an EHP method, and may include a first compressor 210, a first accumulator 220, the EHP gas pipe 230, the EHP liquid pipe 240, a pair of connection valves 232 and 244, a first outdoor heat exchanger 250, a first outdoor heat exchanger control valve 260, a first four-way valve 270, a first accumulator connection pipe 280, and a first check valve 285.

The first compressor 210 may compress the refrigerant, and may be driven by applying a voltage. That is, when the voltage is applied to the first compressor 210, the first compressor 210 may compress the refrigerant. The first accumulator 220 may supply the refrigerant to the first compressor 210. When the refrigerant flows backwards or is introduced into the first compressor 210 as a liquid, the first compressor 210 may be damaged, and thus, the first accumulator 220 may temporarily store a mixture of oil and refrigerant.

The EHP gas pipe 230 may connect the first compressor 210 with at least one indoor unit 10. The EHP gas pipe 230 may connect the first compressor 210 with the indoor unit gas pipe 12. The EHP liquid pipe 240 may connect the first outdoor heat exchanger 250 with at least one indoor unit 10. The EHP liquid pipe 240 may connect the first outdoor heat exchanger 250 with the indoor unit liquid pipe 14.

The pair of connection valves 232 and 244 may include connection valve 232, which may connect the EHP gas pipe 230 with the indoor unit gas pipe 12, and connection valve 244, which may connect the EHP liquid pipe 240 with the indoor unit liquid pipe 14.

The first outdoor heat exchanger 250 may evaporate or condense the refrigerant according to a cooling operation or a warming operation of the air conditioner 1. When the air conditioner 1 performs a cooling operation, the refrigerant may be condensed, and when the air conditioner 1 performs a warming operation, the refrigerant may be evaporated. The first outdoor heat exchanger control valve 260 may control a flow of the refrigerant to the first outdoor heat exchanger 250. As the first outdoor heat exchanger control valve 260 is well known, detailed description thereof has been omitted. The first four-way valve 270 may switch a passage of the refrigerant flowing in the EHP outdoor unit 200. As the first four-way valve 270 is well known, detailed description thereof has been omitted.

The first accumulator connection pipe 280 may connect the first accumulator 220 with the first outdoor heat exchanger 250. The first accumulator connection pipe 280 may be connected with the low pressure refrigerant common pipe 400 which will be described hereinafter. The first check valve 285 may control a flow of the refrigerant flowing out of the first outdoor heat exchanger 250. The first check valve 285 may be provided at the first accumulator connection pipe 280.

The GHP outdoor unit 300 may be an outdoor unit operated using a GHP method, and may include a second compressor 310, a second accumulator 320, an engine 330, the GHP gas pipe 340, the GHP liquid pipe 345, a pair of connection valves 342 and 346, a cooling water heat exchanger 350, a cooling water pump 355, a second outdoor heat exchanger 360, a second outdoor heat exchanger control valve 365, a waste heat exchanger 370, a waste heat exchanger control valve 375, a second four-way valve 380, a second accumulator connection pipe 390, a second check valve 395, and a control valve 397.

The second compressor 310 may compress the refrigerant, and may be operated through driving of the engine 330, which will be described hereinafter. When a driving force is transmitted to the second compressor 310 through the engine 330, the second compressor 310 may compress the refrigerant, similar to the first compressor 210.

The second accumulator 320 may supply the refrigerant to the second compressor 310. When the refrigerant flows backwards or is introduced into the second compressor 310 as a liquid, the second compressor 310 may be damaged, and thus, the second accumulator 320 may temporarily store a mixture of oil and refrigerant, similar to the first accumulator 220. The engine 330 may transmit the driving force to the second compressor 310, and may be operated through burning of the gas fuel, such as LPG and LNG. The GHP outdoor unit 300 may be operated in the GHP method using a burned gas from the engine 330.

The GHP gas pipe 340 may connect the second compressor 310 with the indoor unit gas pipe 12. The GHP liquid pipe 345 may provide a connection with the at least one indoor unit 10. More specifically, the GHP liquid pipe 345 may connect the second outdoor heat exchanger 360 with the indoor unit liquid pipe 14.

The pair of connection valves 342 and 346 may include a connection valve 342, which may connect the GHP gas pipe 340 with the indoor unit gas pipe 12, and a connection valve 346, which may connect the GHP liquid pipe 345 with the indoor unit liquid pipe 14. The cooling water heat exchanger 350 may cool the engine 330. The cooling water heat exchanger 350 may absorb heat of the engine 330 overheated by driving of the engine 330 using cooling water.

The cooling water pump 355 may provide a flowing force to the cooling water, and may be connected with the cooling water heat exchanger 350. Therefore, the cooling water pump 355 may supply the cooling water to the cooling water heat exchanger 150. The second outdoor heat exchanger 360 may evaporate or condense the refrigerant according to the cooling operation or the warming operation of the air conditioner 1, similar to the first outdoor heat exchanger 250. When the air conditioner 1 performs the cooling operation, the refrigerant may be condensed, and when the air conditioner 1 performs the warming operation, the refrigerant may be evaporated.

The second outdoor heat exchanger control valve 365 may control a flow of the refrigerant to the second outdoor heat exchanger 360. As the second outdoor heat exchanger control valve 365 is also well known, detailed description thereof has been omitted.

The waste heat exchanger 370 may evaporate or condense the refrigerant according to the cooling operation or the warming operation of the air conditioner 1, similar to the second outdoor heat exchanger 360. The waste heat exchanger 370 may be a plate type heat exchanger. The waste heat exchanger 370 may evaporate or condense the refrigerant together with the second outdoor heat exchanger 360. The waste heat exchanger control valve 375 may control a flow of refrigerant to the waste heat exchanger 370. As the waste heat exchanger control valve 375 is also well known, detailed description thereof has been omitted.

The second four-way valve 380 may switch a passage of the refrigerant flowing in the GHP outdoor unit 300. As the second four-way valve 380 is also well known, detailed description thereof has been omitted. The second accumulator connection pipe 390 may connect the second accumulator 320 with the second outdoor heat exchanger 360. The second accumulator connection pipe 390 may be connected with the low pressure refrigerant common pipe 400 which will be described hereinafter.

The second check valve 395 may control a flow of the refrigerant flowing out of the second outdoor heat exchanger 360. The second check valve 395 may be provided or in at the second accumulator connection pipe 390. The control valve 397 may also control the flow of the refrigerant flowing out of the second outdoor heat exchanger 360. The control valve 397 may be a solenoid valve, for example. The control valve 397 may be provided at or in the second accumulator connection pipe 390.

When both of the first compressor 210 of the EHP outdoor unit 200 and the second compressor 310 of the GHP outdoor unit 300 deviate from predetermined operation sections or parameters, the control valve 397 may be closed. The low pressure refrigerant common pipe 400 may connect the first outdoor heat exchanger 250 of the EHP outdoor unit 200 and the second outdoor heat exchanger 360 of the GHP outdoor unit 300, and may supply a low pressure refrigerant of the GHP outdoor unit 300 to the EHP outdoor unit 200.

When viewed from a side surface of the EHP outdoor unit 200, the low pressure refrigerant common pipe 400 may be branched from the first accumulator connection pipe 280, and connected with the GHP outdoor unit 300. In addition, when viewed from a side surface of the GHP outdoor unit 300, the low pressure refrigerant common pipe 400 may be branched from the second accumulator connection pipe 390, and may be connected with the EHP outdoor unit 200. The low pressure refrigerant common pipe 400 may connect the first accumulator connection pipe 280 of the EHP outdoor unit 200 and the second accumulator connection pipe 390 of the GHP outdoor unit 300 with each other.

In a common or joint operation of the EHP outdoor unit 200 and the GHP outdoor unit 300, that is, an operation utilizing both the EHP outdoor unit 200 and the GHP outdoor unit 300, or in a defrosting operation of the EHP outdoor unit 200, the low pressure refrigerant common pipe 400 may supply the low pressure refrigerant of the GHP outdoor unit 300 to the EHP outdoor unit 200. In the defrosting operation of the first outdoor heat exchanger 250 of the EHP outdoor unit 200, the GHP outdoor unit 300 may perform heat exchange of the low pressure refrigerant via the second outdoor heat exchanger 360 and the waste heat exchanger 370. The low pressure refrigerant flowing out of the second outdoor heat exchanger 360 may be supplied to the first accumulator 220 of the EHP outdoor unit 200 through the low pressure refrigerant common pipe 400. In the defrosting operation of the second outdoor heat exchanger 360 of the GHP outdoor unit 300, the EHP outdoor unit 200 may perform heat exchange of the low pressure refrigerant via the first outdoor heat exchanger 250, and the GHP outdoor unit 300 may perform heat exchange of the low pressure refrigerant via the waste heat exchanger 370.

Figure 2:
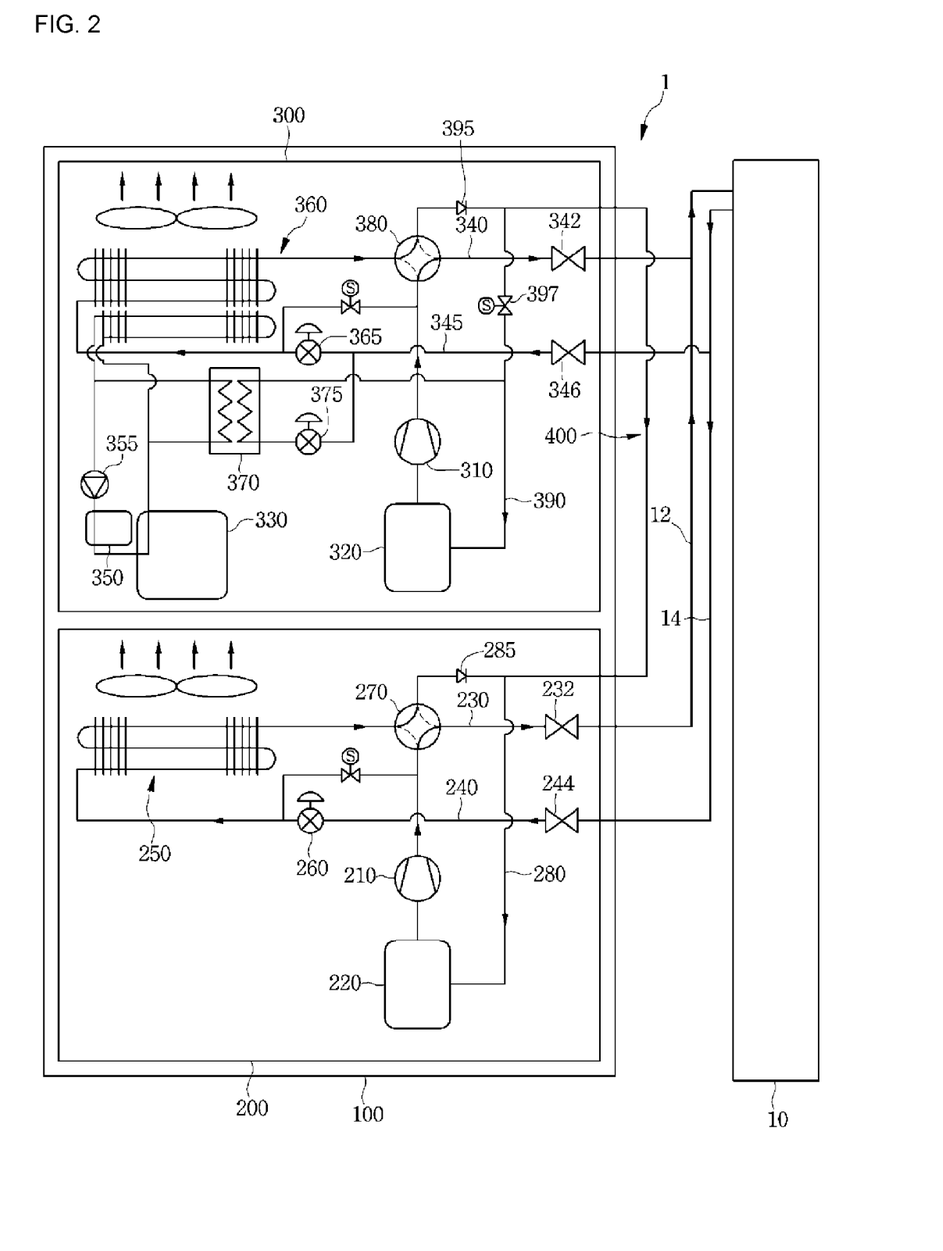
FIG. 2 is a schematic diagram illustrating an operation of the air conditioner of FIG. 1 when waste heat of a GHP outdoor unit is used.
Figure 3:
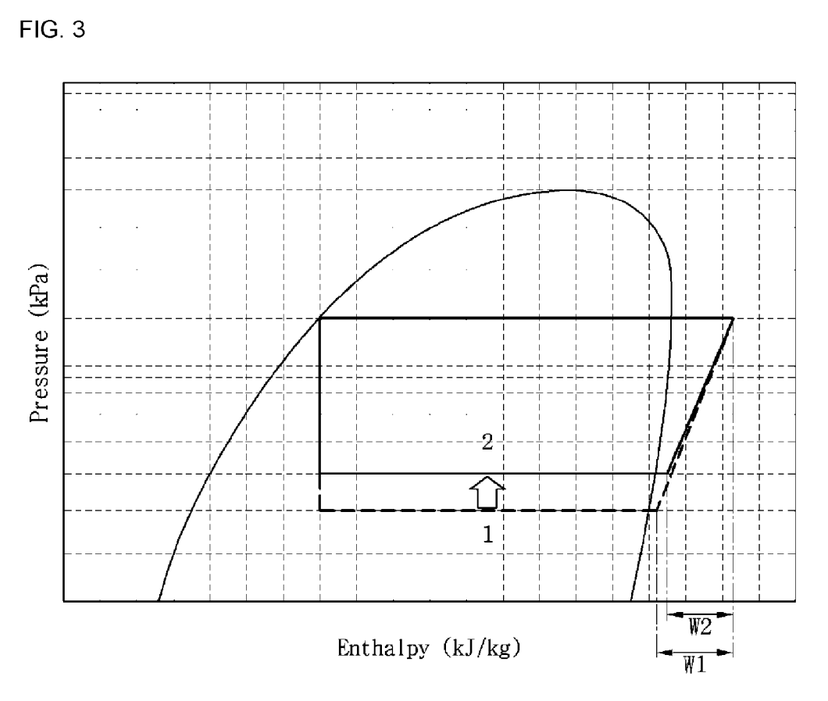
FIG. 3 is a graph illustrating efficiency improvement of an EHP outdoor unit of the air conditioner of FIG. 2.

Hereinafter, an operation of the air conditioner 1 according to an embodiment will be described. FIG. 2 is a schematic diagram illustrating an operation of the air conditioner of FIG. 1 when waste heat of the GHP outdoor unit is used. FIG. 3 is a graph illustrating efficiency improvement of the EHP outdoor unit of the air conditioner of FIG. 2.

Referring to FIGS. 2 and 3, in the warming operation of the air conditioner 1, the GHP outdoor unit 300 may recover the waste heat of the engine 330 from the cooling water, and thus, may be operated at a low pressure, which may be higher than a pressure in the EHP outdoor unit 200.

Therefore, the air conditioner 1 may open the low pressure refrigerant common pipe 400 at a fan operation section of a GHP. To open the low pressure refrigerant common pipe 400 means that the low pressure refrigerant of the second outdoor heat exchanger 360 of the GHP outdoor unit 300 may be transferred not only to the second accumulator 320, but also to the low pressure refrigerant common pipe 400. The lower pressure refrigerant transferred to the low pressure refrigerant common pipe 400 may then flow to the first accumulator 220 of the EHP outdoor unit 200 through the first accumulator connection pipe 280 of the EHP outdoor unit 200.

When the low pressure refrigerant common pipe 400 is opened, the low pressure of the EHP outdoor unit 200 may be increased from reference numeral 1 of FIG. 3 to reference numeral 2 of FIG. 3, as illustrated. Required power of the first compressor 210 of the EHP outdoor unit 200 may be reduced from reference numeral W1 to reference numeral W2 according to a change in an operation low pressure of the EHP outdoor unit 200. This means that efficiency of the EHP outdoor unit 200 may be enhanced or improved.

The low pressure of the GHP outdoor unit 300 may be reduced through the low pressure refrigerant common pipe 400. However, when an operation rate of a fan of the EHP outdoor unit 200 is high, efficiency enhancement of the EHP outdoor unit 200 may be much higher, compared with an efficiency reduction of the GHP outdoor unit 300, and thus, overall efficiency of the air conditioner 1 may be enhanced. Generally, in the warming operation of the air conditioner 1, the operation rate of the fan of the EHP outdoor unit 200 may be about 50%, and thus, the efficiency reduction of the GHP outdoor unit 300 may be minimized.

Figure 4:
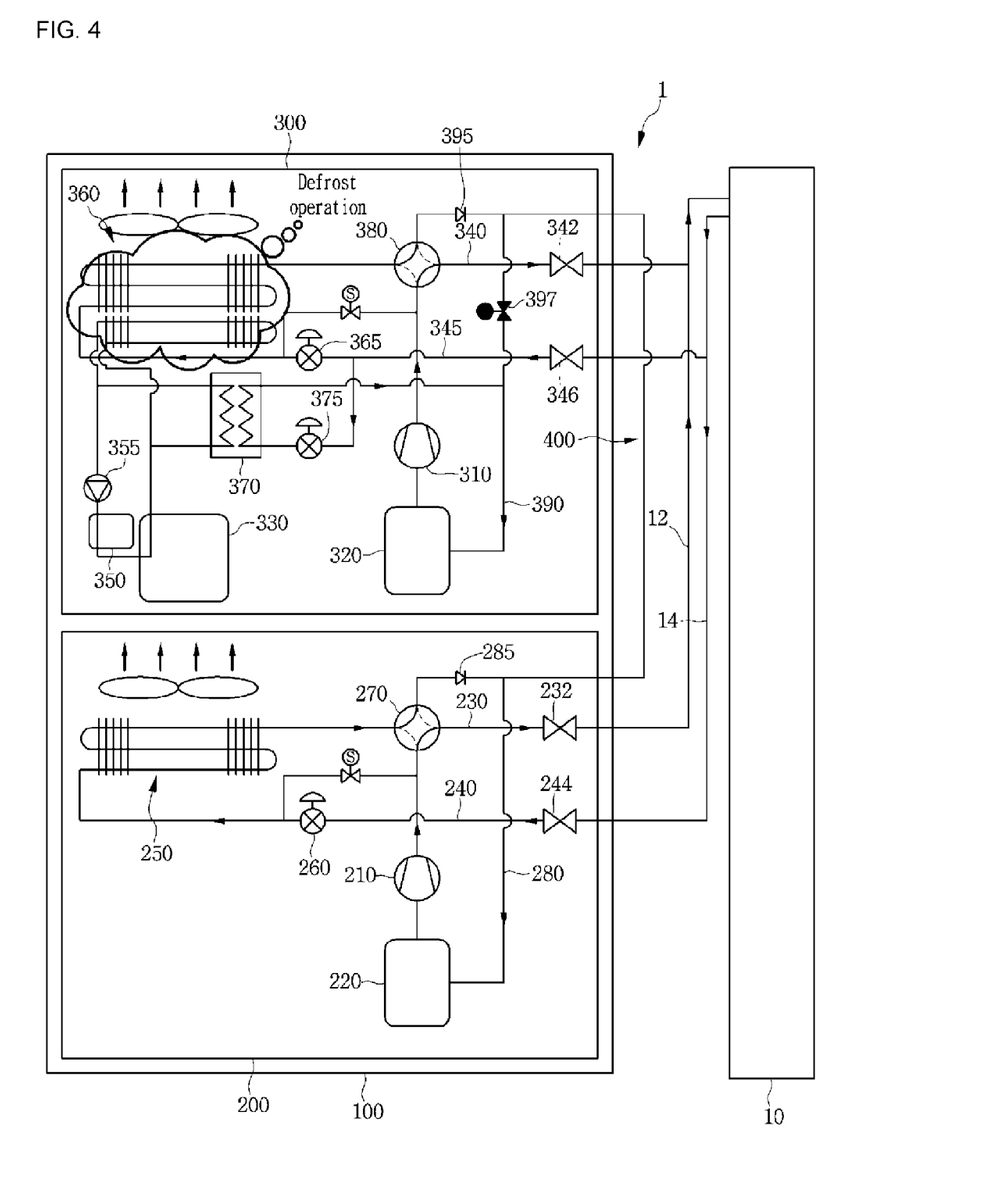
FIG. 4 is a schematic diagram illustrating an operation of the air conditioner of FIG. 1 when a first outdoor heat exchanger of the EHP outdoor unit is used.
Figure 5:
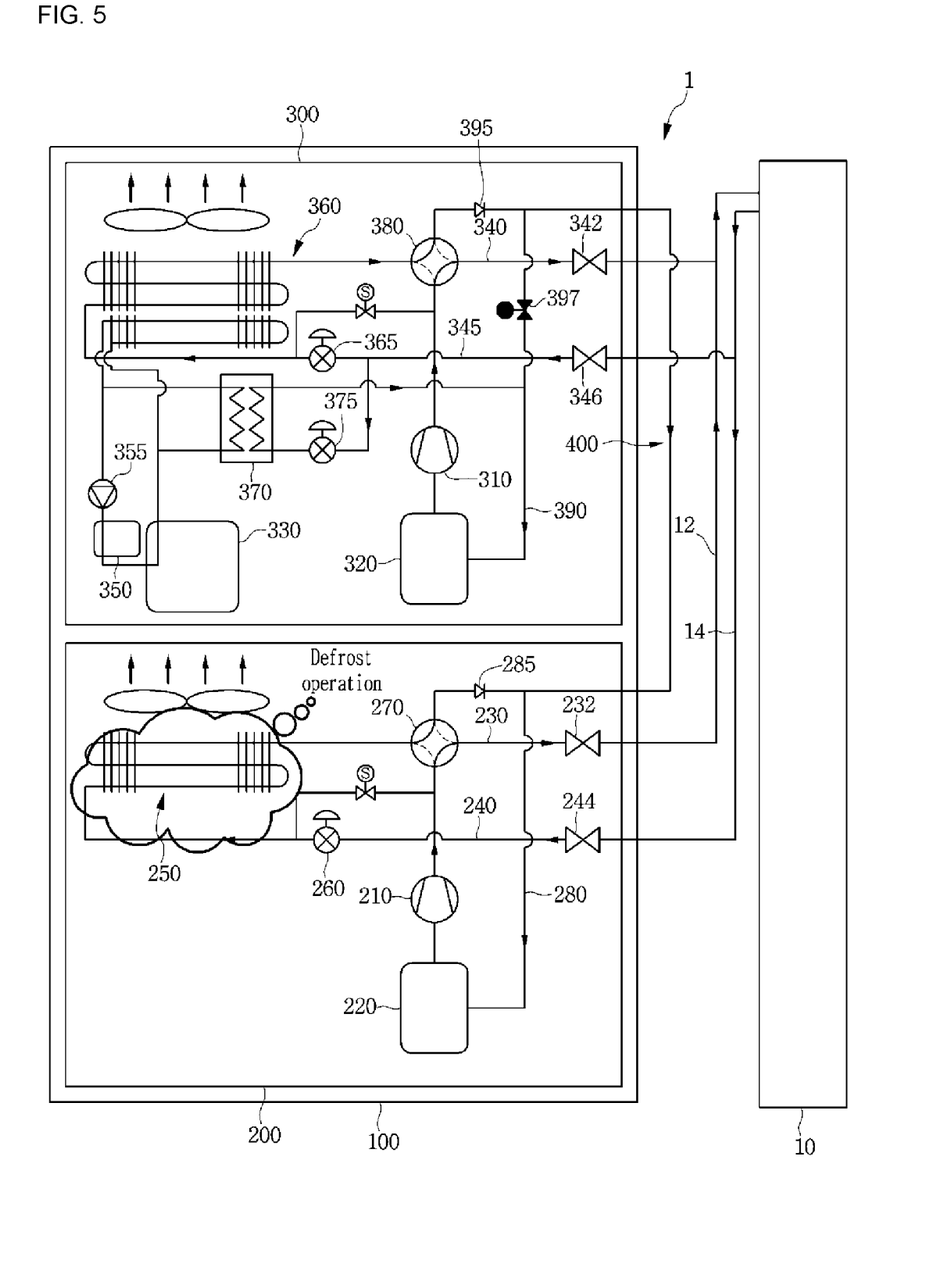
FIG. 5 is a schematic diagram illustrating an operation of the air conditioner of FIG. 1 when a second outdoor heat exchanger of the GHP outdoor unit is used.
Figure 6:
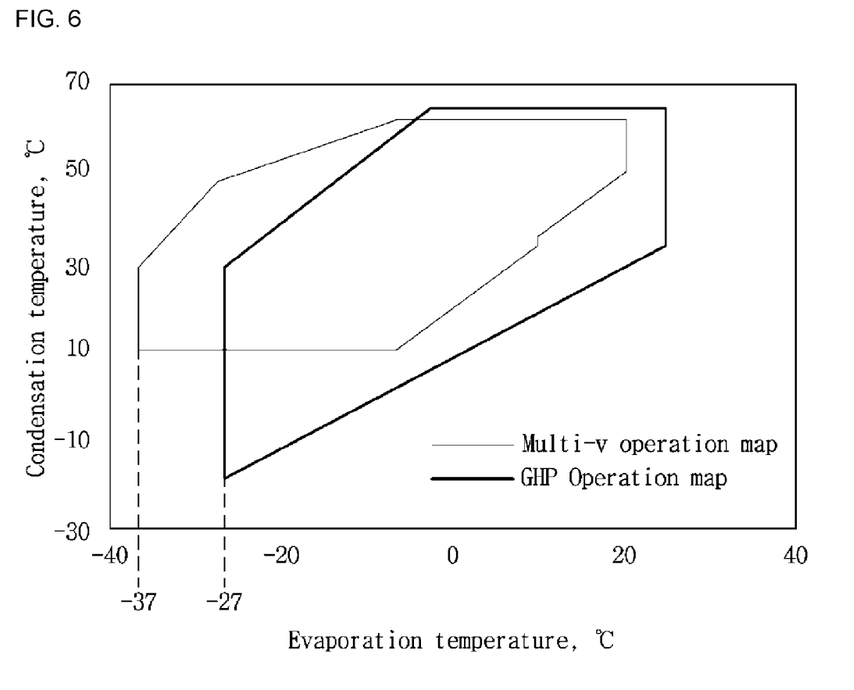
FIG. 6 is a graph illustrating a hybrid operation map when the air conditioner of FIGS. 4 and 5 is operated.

FIG. 4 is a schematic diagram illustrating an operation of the air conditioner of FIG. 1 when a first outdoor heat exchanger of an EHP outdoor unit is used. FIG. 5 is a schematic diagram illustrating an operation of the air conditioner of FIG. 1 when a second outdoor heat exchanger of an GHP outdoor unit of the air conditioner is used. FIG. 6 is a graph illustrating a hybrid operation map when the air conditioner of FIGS. 4 and 5 is operated.

Referring to FIGS. 4 to 6, in the air conditioner 1, when the common operation of both outdoor units 200 and 300 is performed using the low pressure refrigerant common pipe 400, as previously illustrated in FIGS. 2 and 3, the low pressure may be reduced according to a reduction of external air. At this time, the first compressor 210 of the EHP outdoor unit 200 and the second compressor 310 of the GHP outdoor unit 300 may have different operation sections or parameters from each other, as illustrated in FIG. 6. In FIG. 6, a multi-v operation map may represent a predetermined operation section or parameters of the EHP outdoor unit 200, and a GHP operation map may be a predetermined operation section or parameters of the GHP outdoor unit 300. As previously illustrated in FIGS. 2 and 3, the low pressure refrigerant common pipe 400 may be opened and used in a section or within parameter ranges in which the common operation of the EHP outdoor unit 200 and the GHP outdoor unit 300 may be performed.

However, when the GHP operation section or parameters deviate from the predetermined operation section or parameters due to the reduction of the low pressure, the EHP outdoor unit 200 and the GHP outdoor unit 300 may be operated independently. When the both operation sections or parameters deviate from the predetermined operation sections or parameters, the air conditioner 1 may close the control valve 397 of the GHP outdoor unit 300, and then the outdoor unit 100 may be operated. According to one embodiment, when frost is generated at the first outdoor heat exchanger 250 of the EHP outdoor unit 200 or the second outdoor heat exchanger 360 of the GHP outdoor unit 300 due to a reduction in temperature of external air, the defrosting operation may be performed by the waste heat exchanger 370 using the waste heat of the engine 330, and thus, the warming operation may be continuously performed.

More specifically, as illustrated in FIG. 4, when frost is generated at the second outdoor heat exchanger 360 of the GHP outdoor unit 300 due to a reduction in temperature of external air, the EHP outdoor unit 200 may perform the warming operation through the first outdoor heat exchanger 250, and the GHP outdoor unit 300 may perform the warming operation through the waste heat exchanger 370. At this time, the GHP outdoor unit 300 may perform the defrosting operation of the second outdoor heat exchanger 360 using a hot gas of the engine 330.

As Illustrated in FIG. 5, when frost is generated at the first outdoor heat exchanger 250 of the EHP outdoor unit 200 due to the reduction in temperature of the external air, the GHP outdoor unit 300 may transfer the low pressure refrigerant of the second outdoor heat exchanger 360 to the first accumulator 220 of the EHP outdoor unit 200 through the low pressure refrigerant common pipe 400. The EHP outdoor unit 200 may perform the defrosting operation of the first outdoor heat exchanger 250. That is, the EHP outdoor unit 200 may use the second outdoor heat exchanger 360 of the GHP outdoor unit 300 as a heat exchanger.

Therefore, according to one embodiment, even when the first outdoor heat exchanger 250 of the EHP outdoor unit 200 or the second outdoor heat exchanger 360 of the GHP outdoor unit 300 is covered with frost and the defrosting operation is performed, the warming operation may be continuously performed. In other words, according to one embodiment, as the warming operation may be continuously performed while the defrosting operation is being performed due to frosting, it may be possible to prevent performance degradation of the air conditioner 1.

An air conditioner according to embodiments disclosed herein capable of further improving performance and efficiency is provided. Embodiments disclosed herein provide an air conditioner that may include at least one indoor unit or device; an EHP outdoor unit or device connected to the at least one indoor unit, configured to drive a first compressor using electric power, and having a first outdoor heat exchanger for heat exchange of a refrigerant; a GHP outdoor unit or device connected to the at least one indoor unit, and having an engine configured to drive a second compressor through a burned gas, a second outdoor heat exchanger for heat exchange of the refrigerant, and a waste heat exchanger configured to exchange heat with the refrigerant using waste heat of the engine; and a low pressure refrigerant common pipe configured to connect the first outdoor heat exchanger with the second outdoor heat exchanger and to supply a low pressure refrigerant of the GHP outdoor unit to the EHP outdoor unit.

The low pressure refrigerant common pipe may supply the low pressure refrigerant of the GHP outdoor unit to the EHP outdoor unit in a common operation of the EHP outdoor unit and the GHP outdoor unit or a defrosting operation of the EHP outdoor unit. The EHP outdoor unit may include a first accumulator configured to supply the refrigerant to the first compressor; and a first accumulator connection pipe configured to connect the first outdoor heat exchanger with the first accumulator, and the low pressure refrigerant common pipe may be branched from the first accumulator connection pipe, and connected to the GHP outdoor unit.

The GHP outdoor unit may include a second accumulator configured to supply the refrigerant to the second compressor, and a second accumulator connection pipe configured to connect the second outdoor heat exchanger with the second accumulator. The low pressure refrigerant common pipe may be branched from the first accumulator connection pipe, and connected to the EHP outdoor unit. A first check valve configured to control a flow of the refrigerant flowing out of the first outdoor heat exchanger may be provided at or on the first accumulator connection pipe.

A second check valve configured to control a flow of the refrigerant flowing out of the second outdoor heat exchanger may be provided at or on the second accumulator connection pipe. A control valve configured to control a flow of the refrigerant flowing out of the first outdoor heat exchanger may be provided at or on the second accumulator connection pipe. The control valve may be closed when the first and second compressors deviate from predetermined operation sections. The control valve may be a solenoid valve.

In a defrosting operation of the first outdoor heat exchanger, the GHP outdoor unit may perform heat exchange of the low pressure refrigerant through the second outdoor heat exchanger and the waste heat exchanger. In a defrosting operation of the first outdoor heat exchanger, the low pressure refrigerant flowing out of the second outdoor heat exchanger may be supplied to the first accumulator of the EHP outdoor unit through the low pressure refrigerant common pipe. In a defrosting operation of the second outdoor heat exchanger, the EHP outdoor unit may perform heat exchange of the low pressure refrigerant through the first outdoor heat exchanger, and the GHP outdoor unit may perform the heat exchange of the low pressure refrigerant through the waste heat exchanger.

According to embodiments disclosed herein, an air conditioner capable of further improving performance and efficiency may be provided.

Even though all elements of embodiments may be coupled into one or operated in a combined state, embodiments are not limited to such embodiments. That is, all elements may be selectively combined with each other without departing the scope. Further, when it is described that one comprises (or comprises or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   at least one indoor device;
   an electric heat pump (EHP) outdoor device connected to the at least one indoor device, configured to drive a first compressor using electric power, and having a first outdoor heat exchanger that performs heat exchange using a refrigerant;
   a gas heat pump (GHP) outdoor device connected to the at least one indoor device, and including an engine configured to drive a second compressor using a burned gas, a second outdoor heat exchanger that performs heat exchange using the refrigerant, and a waste heat exchanger configured to exchange heat with the refrigerant using waste heat of the engine; and
   a low pressure common refrigerant pipe configured to connect the first outdoor heat exchanger with the second outdoor heat exchanger and to supply a low pressure refrigerant of the GHP outdoor device to the EHP outdoor device.

2. The air conditioner according to claim 1, wherein the low pressure refrigerant common pipe supplies the low pressure refrigerant of the GHP outdoor device to the EHP outdoor device when a joint operation of the EHP outdoor device and the GHP outdoor device is performed or a defrosting operation of the EHP outdoor device is performed.

3. The air conditioner according to claim 1, wherein the EHP outdoor device includes a first accumulator configured to supply the refrigerant to the first compressor and a first accumulator connection pipe configured to connect the first outdoor heat exchanger with the first accumulator, and wherein the low pressure refrigerant common pipe is branched from the first accumulator connection pipe, and connected to the GHP outdoor device.

4. The air conditioner according to claim 3, wherein the GHP outdoor device includes a second accumulator configured to supply the refrigerant to the second compressor and a second accumulator connection pipe configured to connect the second outdoor heat exchanger with the second accumulator, and wherein the low pressure refrigerant common pipe is branched from the first accumulator connection pipe and connected to the EHP outdoor device.

5. The air conditioner according to claim 3, further including a first check valve installed in the first accumulator connection pipe and configured to control a flow of the refrigerant flowing out of the first outdoor heat exchanger.

6. The air conditioner according to claim 5, further including a second check valve installed in the second accumulator connection pipe configured to control a flow of the refrigerant flowing out of the second outdoor heat exchanger.

7. The air conditioner according to claim 4, further including a control valve installed in the second accumulator connection pipe and configured to control a flow of the refrigerant flowing out of the first outdoor heat exchanger.

8. The air conditioner according to claim 7, wherein the control valve is closed when the first and second compressors deviate from predetermined operation parameters.

9. The air conditioner according to claim 7, wherein the control valve includes a solenoid valve.

10. The air conditioner according to claim 8, wherein the GHP outdoor device operates such that heat exchange of the low pressure refrigerant through the second outdoor heat exchanger and the waste heat exchanger is performed when a defrosting operation of the first outdoor heat exchanger is performed.

11. The air conditioner according to claim 10, wherein the GHP outdoor device operates such that the low pressure refrigerant flowing out of the second outdoor heat exchanger is supplied to the first accumulator of the EHP outdoor device through the low pressure refrigerant common pipe when the defrosting operation of the first outdoor heat exchanger is performed.

12. The air conditioner according to claim 8, wherein when a defrosting operation of the second outdoor heat exchanger is performed, the EHP outdoor device performs heat exchange of the low pressure refrigerant through the first outdoor heat exchanger, and the GHP outdoor device performs the heat exchange of the low pressure refrigerant through the waste heat exchanger.

13. A method for controlling an air conditioner which includes at least one indoor device; an electric heat pump (EHP) outdoor device connected to the at least one indoor device, configured to drive a first compressor using electric power, and having a first outdoor heat exchanger for heat exchange of a refrigerant; a gas heat pump (GHP) outdoor device connected to the at least one indoor device, and having an engine configured to drive a second compressor through a burned gas, a second outdoor heat exchanger for heat exchange of the refrigerant, and a waste heat exchanger configured to perform the heat exchange with the refrigerant using waste heat of the engine; and a low pressure refrigerant common pipe configured to connect the first outdoor heat exchanger with the second outdoor heat exchanger, the control method comprising:
  driving the EHP outdoor device and the GHP outdoor device; and
  supplying the low pressure refrigerant of the GHP outdoor device to the EHP outdoor device through the low pressure refrigerant common pipe.

14. The method according to claim 13, wherein the low pressure refrigerant common pipe supplies the low pressure refrigerant of the GHP outdoor device to the EHP outdoor device when a common operation of the EHP outdoor device and the GHP outdoor device is performed or a defrosting operation of the EHP outdoor device is performed.

15. The method according to claim 13, wherein the EHP outdoor device includes a first accumulator configured to supply the refrigerant to the first compressor; and a first accumulator connection pipe configured to connect the first outdoor heat exchanger with the first accumulator, and wherein the low pressure refrigerant common pipe is branched from the first accumulator connection pipe and connected to the GHP outdoor device.

16. The method according to claim 15, wherein the GHP outdoor device includes a second accumulator configured to supply the refrigerant to the second compressor; and a second accumulator connection pipe configured to connect the second outdoor heat exchanger with the second accumulator, and wherein the low pressure refrigerant common pipe is branched from the first accumulator connection pipe and connected to the EHP outdoor device.

17. The method according to claim 15, further including a first check valve installed on the first accumulator connection pipe and configured to control a flow of the refrigerant flowing out of the first outdoor heat exchanger.

18. The method according to claim 16, further including a second check valve installed on the second accumulator connection pipe and configured to control a flow of the refrigerant flowing out of the second outdoor heat exchanger.

19. The method according to claim 16, further including a control valve installed on the second accumulator connection pipe and configured to control a flow of the refrigerant flowing out of the first outdoor heat exchanger.

20. The method according to claim 19, wherein the control valve is closed when the first and second compressors deviate from predetermined operation parameters.

21. An air conditioner comprising:
  at least one indoor device;
  an electric heat pump (EHP) outdoor device connected to the at least one indoor device, configured to drive a first compressor using electric power, and having a first outdoor heat exchanger that performs heat exchange using a refrigerant and a first four-way valve;
  a gas heat pump (GHP) outdoor device connected to the at least one indoor device, and including an engine configured to drive a second compressor using a burned gas, a second outdoor heat exchanger that performs heat exchange using the refrigerant, a waste heat exchanger configured to exchange heat with the refrigerant using waste heat of the engine, a second four-way valve, and a control valve that controls a flow of the refrigerant between the EHP outdoor device and the GHP outdoor device; and a low pressure common refrigerant pipe configured to connect the first outdoor heat exchanger with the second outdoor heat exchanger and to supply a low pressure refrigerant of the GHP outdoor device to the EHP outdoor device, wherein the control valve is closed when the first and second compressors deviate from predetermined operation parameters.

22. The air conditioner according to claim 21, wherein the low pressure refrigerant common pipe supplies the low pressure refrigerant of the GHP outdoor device to the EHP outdoor device when a joint operation of the EHP outdoor device and the GHP outdoor device is performed or a defrosting operation of the EHP outdoor device is performed.

23. The air conditioner according to claim 22, wherein the EHP outdoor device further includes a first accumulator and a first accumulator connection pipe that connects the first outdoor heat exchanger and the first accumulator, and wherein the GHP outdoor device further includes a second accumulator and a second accumulator connection pipe that connects the first outdoor heat exchanger and the second accumulator.

* * * * *